March 19, 1963  H. W. GRISWOLD  3,081,514
FORAMINOUS NONWOVEN FABRIC
Filed April 26, 1955  5 Sheets-Sheet 2

INVENTOR
HECTOR W. GRISWOLD
BY
Charles A. Harris
ATTORNEY

March 19, 1963     H. W. GRISWOLD     3,081,514
FORAMINOUS NONWOVEN FABRIC
Filed April 26, 1955     5 Sheets-Sheet 3
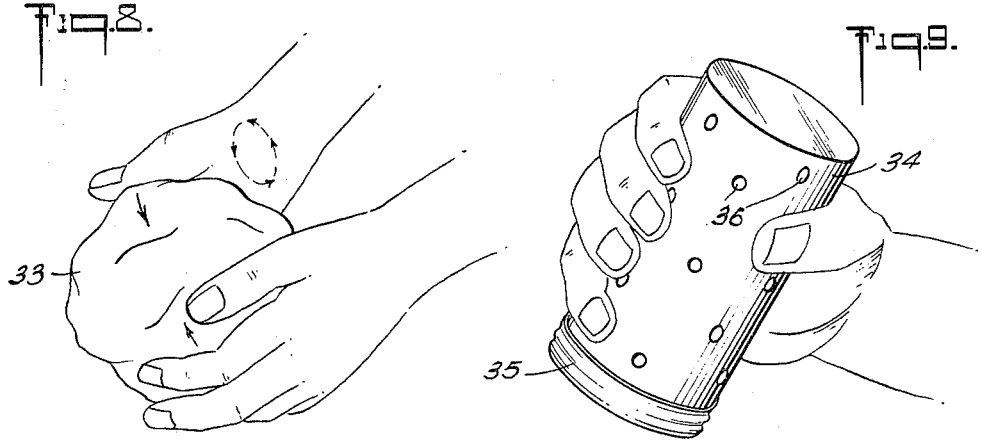
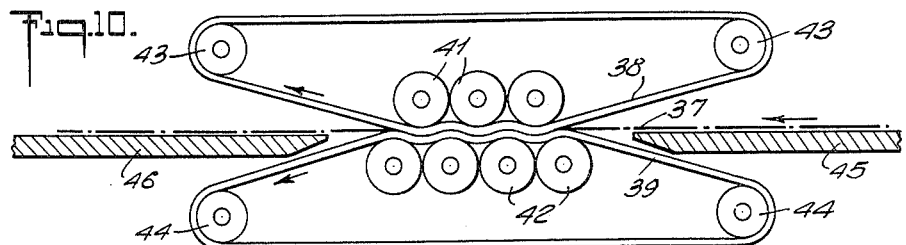
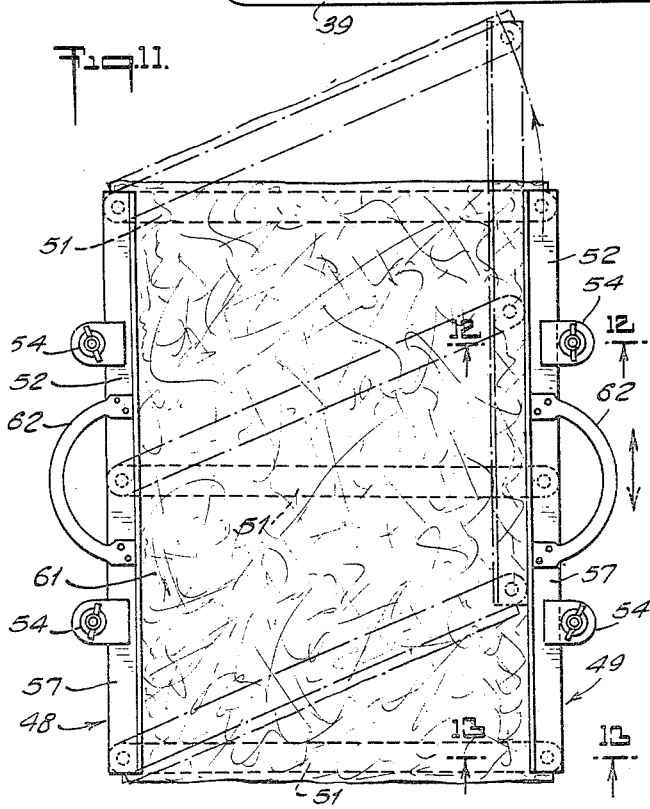
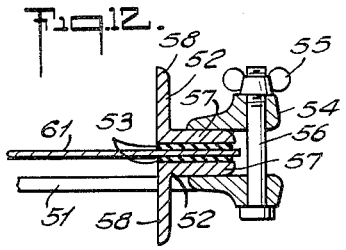
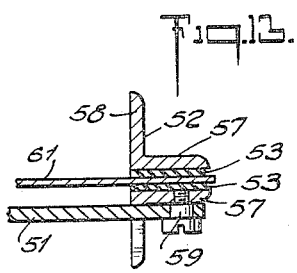
INVENTOR
HECTOR W. GRISWOLD
BY Charles A. Harris
ATTORNEY March 19, 1963 H. W. GRISWOLD 3,081,514
FORAMINOUS NONWOVEN FABRIC
Filed April 26, 1955 5 Sheets-Sheet 4
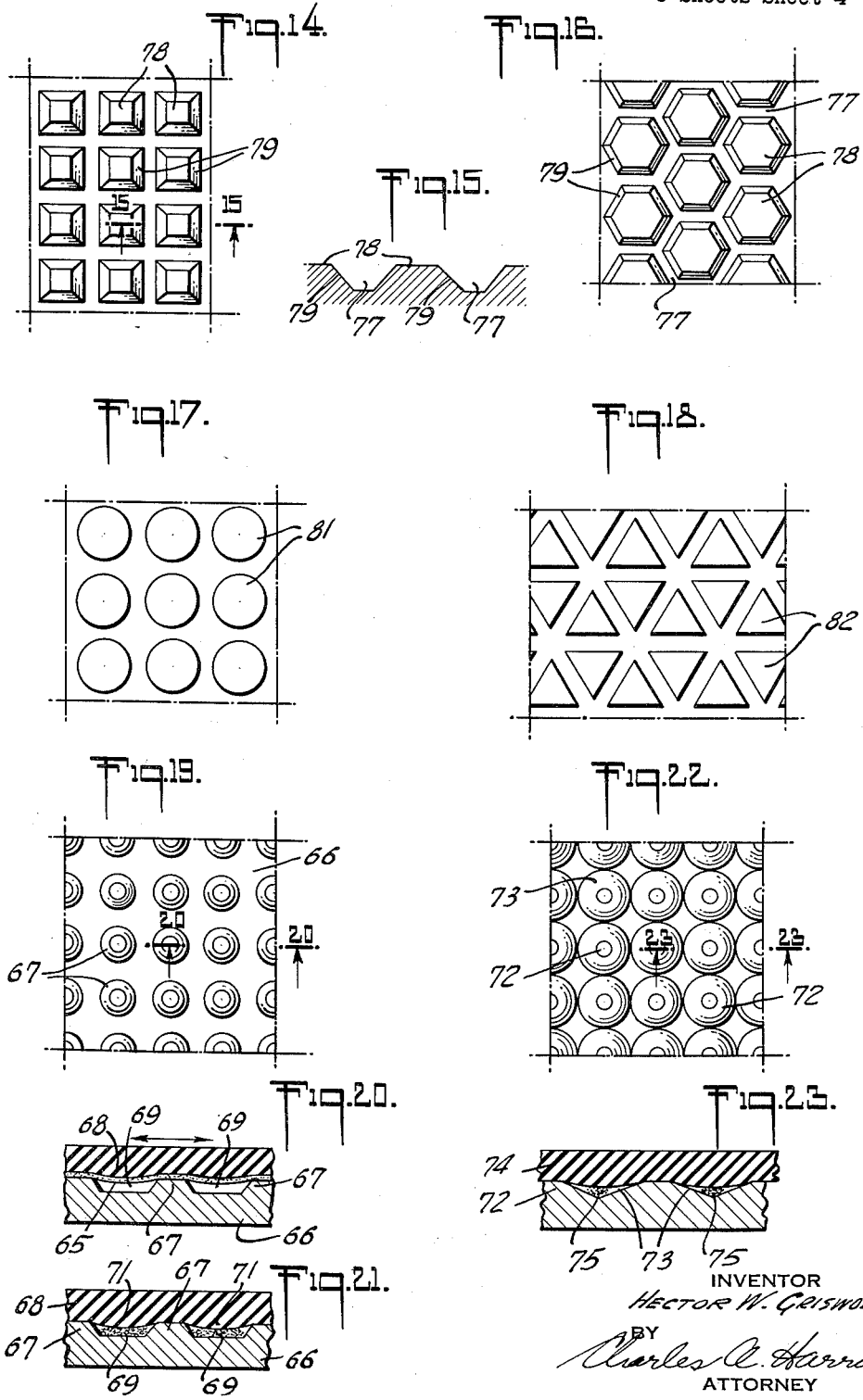
INVENTOR
HECTOR W. GRISWOLD
BY
Charles A. Harris
ATTORNEY March 19, 1963 H. W. GRISWOLD 3,081,514
FORAMINOUS NONWOVEN FABRIC
Filed April 26, 1955 5 Sheets-Sheet 5

INVENTOR
HECTOR W. GRISWOLD
BY
Charles A. Harris
ATTORNEY

United States Patent Office 3,081,514
Patented Mar. 19, 1963

3,081,514
FORAMINOUS NONWOVEN FABRIC
Hector W. Griswold, Longmeadow, Mass., assignor, by mesne assignments, to Johnson & Johnson, New Brunswick, N.J., a corporation of New Jersey
Filed Apr. 26, 1955, Ser. No. 503,871
12 Claims. (Cl. 28—78)

This invention relates to textile fabrics and is more particularly concerned with so-called "nonwoven" fabrics, i.e., fabrics produced directly from fibers without the use of conventional spinning, weaving, or knitting operations.

The present application is a continuation in part of my co-pending application, Serial No. 437,119, filed June 16, 1954.

Heretofore nonwoven fabrics have been essentially different in structure from fabrics which have been woven or knitted. In a woven or knitted fabric, the fibers of the material making up the fabric do not occur individually, but are twisted into yarns or threads which in turn are woven or knitted into the fabric. In the well known spinning operation, fibers are spun or twisted together tightly into mechanical and frictional engagement with one another to form yarns which are substantially circular in cross section. It is these yarns, not the fibers acting individually, which serve as the structural members of the resulting woven or knitted fabrics. Generally speaking, these fabrics comprise recticular structures of intersecting, intertwining yarns which define interstices between them.

Nonwoven fabrics have been of two main types, felts and bonded webs. In each of these, the fibers making up the fabric occur individually and act individually as structural members. This is true even though the fibers in many felts are so highly interlocked and compressed together that it is difficult to identify individual fibers. Hat felts, for instance, are extremely dense, relative "hard" fabrics without apparent interstices, which are quite dissimilar in appearance and qualities to woven or knitted structures. On the other hand, the fibers in bonded webs are usually flatly assembled in layers, more or less oriented in one direction, as in a card web; or arranged in a "random" manner, as in an air laid isotropic web. Various bonding agents have been used to print a binder pattern on such webs or to impregnate them to hold the individual fibers together. In this type of fabric, the fibers may remain relatively straight and overlapping one another with very little interlocking between them. They are usually arranged in a more or less uniformly spaced condition in the plane of the web, such that only very small interstices are apparent between the overlapped fibers and those fibers between interstices remain spaced and more or less flatly arranged, possessing little similarity to the yarns of woven or knitted fabrics.

The present invention contemplates a nonwoven fabric wherein the fibers are oriented and compacted to define interconnected groupings of fiber segments and openings or areas of low fiber density between groupings. The groupings or groups are connected by fibers extending from one to another in such a way that they are common to a plurality of groupings. It is preferred that the average length of the fibers be considerably greater than the lengths of the groups containing them with the result that the groups predominantly comprise only parts or segments of the fibers passing through them. Preferably the fibers average at least about ¼ inch in length and are textile-like in nature, i.e., flexible and distinct or unbeaten in the case of wood pulp. In general, the groupings are connected at junctures wherein individual fibers extend in a plurality of diverse directions, while the fiber segments in the groups are relatively parallelized wth respect to one another and more closely assembled than at the junctures.

In one embodiment of a fabric according to this invention, the fiber segments in the groups are closely associated and substantially parallelized along the axes of the groups to the extent that the groups resemble spun yarns. The segments may be so closely arranged in overlapping relationship about the axes of the groups that the groups possess yarn-like thickness and are generally yarn-like in cross section.

In the foraminous structure formed by the interconnected fiber groupings in accordance with the present invention the fibers lie in a state of mechanical equilibrium. The fibers are mechanically engaged, both frictionally and/or by interlocking of the fibers, to the extent that the arrangement of fibers is one of equilibrium.

The nature and appearance of the fibrous structure may be varied with the materials and methods used to prepare a particular fabric according to this invention. For instance, the fiber groupings may appear relatively tight or relatively loose and fluffy and the fabric may resemble a gauze, a fluffy knitted fabric, etc. The groups may act as structural members and as capillary passages for conducting liquids, and the openings which they define may render the fabric permeable to liquids and gases and contribute to absorptive capacity. The three dimensional nature of the interconnected bundles and the arrangement of the fibers contained therein contribute to softness, loft, flexibility, etc. Thus, the resulting nonwoven fabric may be designed to have excellent fabric qualities of handle, drape, loft, permeability, absorptivity, moisture conducting power, as well as other characteristics, and, additionally, the appearance of a woven or knitted fabric.

Generally speaking, the mechanical and frictional engagement between the fibers in the bundles, while contributing strength to the fabric, may be insufficient in itself to provide adequate tensile strength for most applications. Therefore, it usually will be desirable to strengthen the fabric in some way. For instance, an adhesive bonding material or binder may be applied by means such as printing or impregnation. As will be described more fully hereinafter, some binder may be contained in the web during and after its formation into the fabric of this invention. This binder may not be present in sufficient quantity to provide the desired strength in the fabric. If this is the case, additional binder may be required to provide the desired strength.

Due to their structure and appearance and other qualities described above, fabrics of this invention are particularly adapted for use in surgical dressings, absorbent dressings such as sanitary napkins and diapers, most suitably for covering sanitary napkins and diapers, in wiping cloths, toweling, filter materials, lining materials, industrial base fabrics, as a substitute for gauze and gauze-like fabrics in general, and a variety of other applications.

The present invention contemplates methods for producing the fabric of this invention from a base web consisting of one or more layers of fibers such as may be produced by carding, garnetting, air deposition, paper making techniques, etc. External forces may be applied to such a base web by members which may oscillate, compress the web, shake it, etc., to cause fibers in the layer to move into new positions in closer proximity with one another and form interconnected fibrous groupings as described hereinbefore. During the application of the external forces to the base web, sufficient local support should be provided for the web to assure the maintenance of its integrity, i.e., to prevent it from being torn or pulled apart, and to prevent the formation of clumps of fibers, large holes, etc. However, the support provided should allow the fibers in the layer to move as described above while the integrity of the web is being maintained. The web may be supported physically by means in local contact therewith, both above and below it, or it may be supported by an adhesive binder distributed in the web in such a way that it may be softened to the extent that it will allow the aforementioned movement of fibers while it remains effective to maintain the integrity of the web.

FIG. 8 is an isometric view of the web of FIG. 2 being worked between the hands in accordance with one embodiment of the invention;

FIG. 9 is an isometric view illustrating another method of producing a fabric according to this invention;

FIG. 10 is a schematic view partly in longitudinal section of another device for forming a fabric according to this invention;

FIG. 11 is a plan view of a still different apparatus for this purpose;

FIG. 12 is a view partly in section and partly in elevation along the line 12—12 of FIG. 11;

FIG. 13 is a view partly in section and partly in elevation along the line 13—13 of FIG. 11;

FIG. 14 is a plan view of means presenting projections for forming a patterned fabric according to this invention;

FIG. 15 is a sectional view along the line 15—15 of FIG. 14;

FIG. 16 is a view similar to FIG. 14 of a somewhat different pattern of projections;

FIG. 17 is a similar view showing circular projections arranged in a square pattern;

FIG. 18 is a similar view showing triangular projections;

FIG. 19 is a plan view of a member presenting spaced frusto-conical projections;

FIG. 20 is an enlarged schematic sectional view along the line 20—20 of FIG. 19, showing a layer of starting material positioned between the ends of the projections and a cooperating member also in section;

FIG. 21 is a view similar to FIG. 20 at a later stage in the process;

FIG. 22 is a plan view similar to FIG. 19 showing a somewhat different form of projections;

FIG. 23 is a sectional view similar to FIG. 20 along the line 23—23 of FIG. 22;

Figure 1:
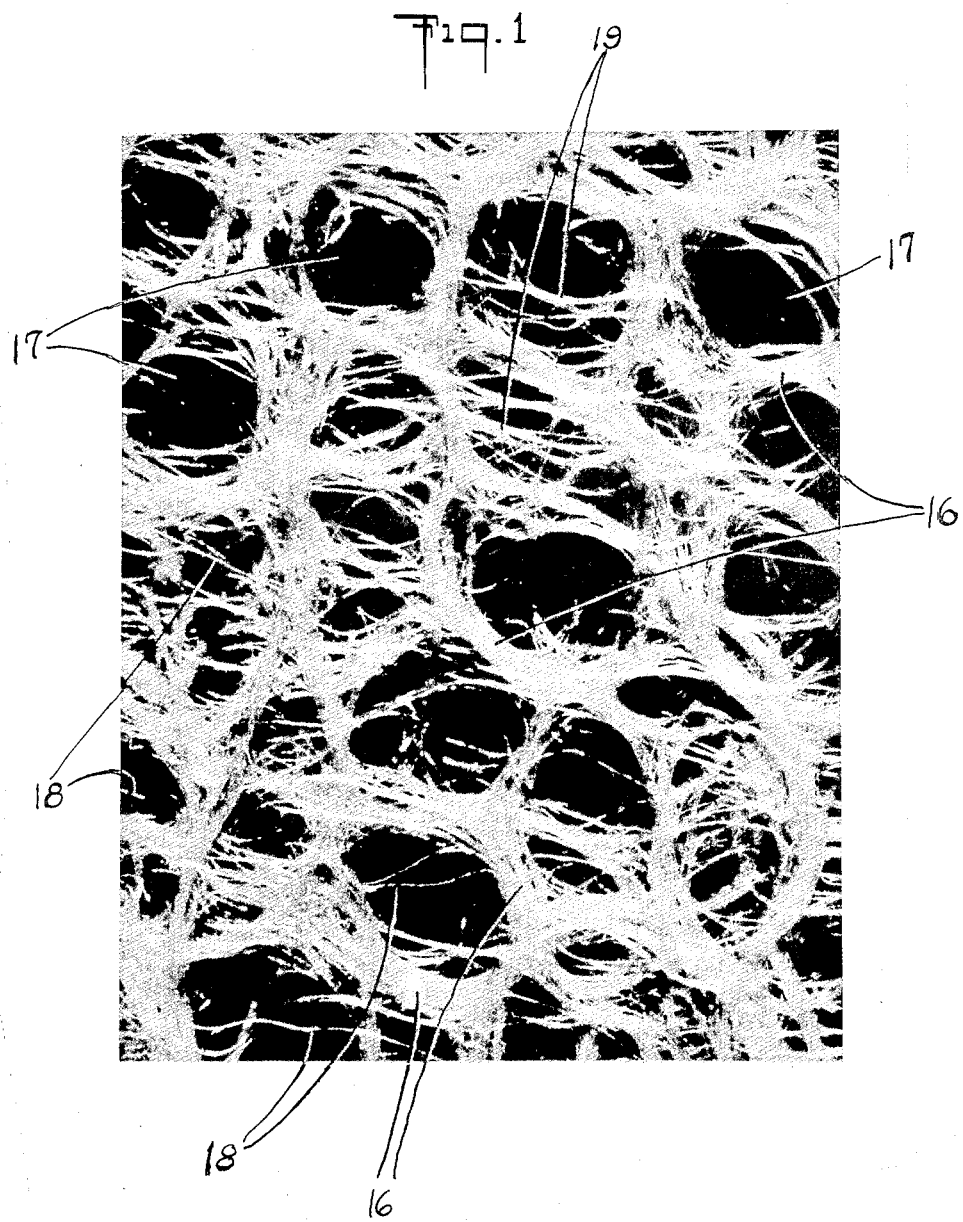
FIG. 1 is a photomicrograph of a typical area of the fabric of Example I of this application at an original enlargement of approximately 30 to 1.

Referring to FIG. 1 of the drawings, there is shown a typical area of the fabric of Example 1 of this application comprising interconnected yarn-like groups 16 of fiber segments. The interconnected groups extend more or less uniformly in varying directions in the plane of the web and define relatively large openings 17 between them. There appear to be a large number of fiber segments 18 which lie outside the groups and extend between them. Certain of these segments may combine to form irregularly-located small groups 19 extending between the main groups 16. As is seen from FIG. 1 and from FIGS. 4–7, the yarn-like fiber groups in areas of fabric containing the same are located between spaced generally parallel planes generally defining the opposed surfaces of the fabric in said areas. Generally in these areas the yarn-like fiber groups predominantly constitute the body of the fabric.

Since it is difficult to distinguish the shape and arrangement of the individual fibers in FIG. 1, a more detailed description of the fabric of this invention will be reserved for the somewhat stylized version of FIGS. 4 through 7, described hereinafter.

Figure 2:
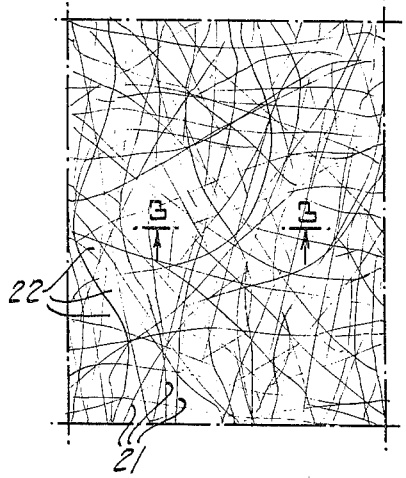
FIG. 2 is an enlarged schematic plan view of a typical base web from which a fabric according to this invention may be formed.
Figure 3:
FIG. 3 is an enlarged cross sectional view taken along the line 3—3 of FIG. 2.

Referring to FIGS. 2 and 3 of the drawings, a nonwoven fabric according to one embodiment of this invention may be formed from a base web of flexible fibers 21 arranged in substantially nonoriented, overlapping, intersecting relation with one another, such that there is only slight entanglement between them. The fibers in the web are flatly assembled in nongrouped relationship with one another, such that they define only relatively small interstices 22 between them. Preferably, the web contains a small percentage of a uniformly dispersed water-softenable adhesive binder to assist in maintaining the web integrity as it is subjected to forces designed to cause its fibers to form into interconnected groups.

Figure 4:
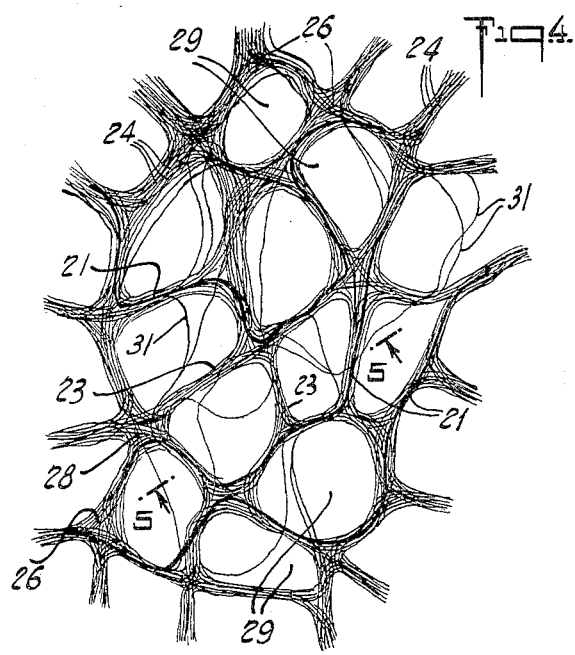
FIG. 4 is a schematic plan view of the web of FIG. 2 after it has been rearranged to form a fabric typical of one embodiment according to this invention.
Figure 5:
FIG. 5 is an enlarged sectional view taken along the line 5—5 of FIG. 4.

In FIGS. 4 through 7, there is shown one embodiment of a fabric according to this invention formed from the above-described base web. This fabric comprises interconnected yarn-like groups 23 of individual fiber segments 24. The fiber segments 24 are substantially parallelized and closely arranged about the longitudinal axes of the groups to the extent that the groups 23 are yarn-like in cross section. As shown in FIG. 5, the groups possess yarn-like thickness in two dimensions, both in the plane of the web and perpendicular thereto, and are more or less oval in cross section. In this figure, an appreciable number of the fibers 21 in the groups appear to be in contact with one another. The groups 23, in turn, appear to be spaced from one another by distances substantially greater than the widths of the groups themselves.

Figure 6:
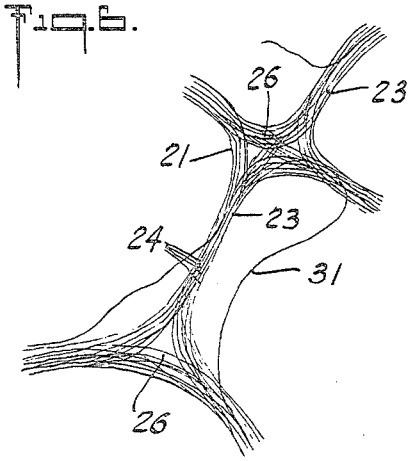
FIG. 6 is a greatly enlarged plan view of one portion of FIG. 4.
Figure 7:
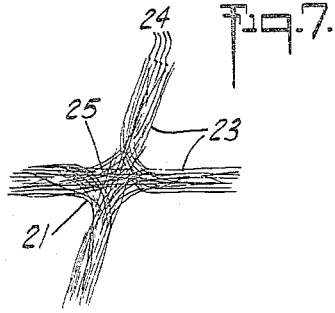
FIG. 7 is a similar plan view of another portion of FIG. 4.

As shown in FIGS. 4 and 6, the groups 23 are interconnected by fibers which are common to a plurality of groups. In these figures, the individual fibers 21 have an average length which is considerably longer than the groups containing them so that most of the fibers extend through a plurality of interconnected groups, as indicated by the heavy lines representing single fibers in FIG. 4. The groups may be of such a length that a fiber ⅜ inch long may occur in several groups. Thus, generally speaking, each of the groups contains only portions or segments 24 of the fibers 21 passing through it. Due to the relatively random arrangement of fibers in the base web the segments in a given group may be located along entirely different portions of the lengths of their respective fibers. As illustrated in FIGURES 4 and 6 and in FIGURE 7, the fibers connecting individual groups form junctures 26 and 25, respectively, wherein the fibers extend in a plurality of diverse directions. At the junctures 25 and 26, the fibers may bend or curve to the left or the right or cross over one another to continue in a more or less straight path. The groups 23 may join almost directly, forming relatively tight junctures 25 between them as shown in FIG. 7, or, as illustrated in FIG. 6, looser junctures 26 may be formed which comprise web-like areas wherein individual fibers extend in various directions in overlapping intersecting relation with one another. When groupings are formed predominantly in one direction of the fabric, as will be described hereinafter, they may appear to be interconnected by a multiplicity of more or less spaced individual fiber segments which do not define definite junctures as described above. Actually, there may be a number of small groups comprising only a few fibers each extending between the main groupings and interconnecting them.

Referring to FIGS. 4, 6, and 7, the relative orientations of interconnected groups may depend upon the lay of the fibers in the base web as well as the conditions and methods used to form the groups. FIG. 6 illustrates a group 23 extending between two areas of interconnections 26 with other groups. At one of these areas four groups join and at the other three come together. Typically, either three or four groups may join at each juncture. However, more than four may interconnect at one juncture as illustrated in 28 in FIG. 4. Grouping may vary in sharpness in different areas of the wab. For instance, grouping in the upper left hand area of FIG. 4 appears less tight than in other areas of this same figure. The fiber segments appear less parallelized and more loosely arranged in the groups in the upper left than elsewhere. This type of difference or irregularity in group formation will appear to be much more extreme as fabrics of this invention are viewed under greater magnification. For instance, the fabric illustrated in FIG. 4, at a magnification of the order of thirty to one, appears much less regular than if viewed by the naked eye.

As shown in FIGS. 4 and 5, interconnected groups 23 may define with adjacent groups openings or areas of low fiber density 29. Generally speaking, the more tightly the groups are formed, the more clearly defined will be the openings 29 between them. The interconnected groups may form a recticular fabric structure having openings which appear similar to the interstices of woven or knitted fabrics and the size of these openings may be controlled to vary the permeability of the fabric to moisture and air. The openings between groups may contain individual fiber segments 31 which lie outside of the groups. The free segments 31 may represent portions of fibers which deviate from the basic structure of interconnected bundles. The extent of fiber deviation or the number of smaller fibrous groupings may vary with the base web and the methods used to form the fabric and, as mentioned hereinbefore in connection with group regularity, will be much less apparent when viewed by the naked eye than under a microscope.

Figure 27:
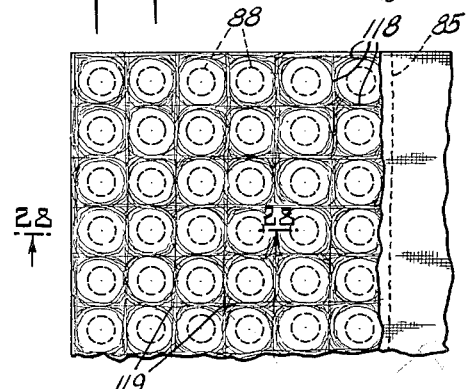
FIG. 27 is a view similar to FIG. 25 with the drum portion shown in phantom, showing the layer after it has been formed into a fabric according to this invention.

As mentioned hereinafter in connection with FIGS. 14 through 28, fabrics according to this invention may be formed in such a way that the fiber groupings extend in a regular reticular pattern defining a regular pattern of openings, such as is shown in FIG. 27. Fiber deviation and irregular group formation may be kept to a minimum particularly in fabrics formed by the technique illustrated in FIGS. 24 through 28. The fiber segments may be closely associated in the groups to the extent that the segments appear to be in appreciable contact with one another along their length when viewed by the naked eye or under a microscope at low magnifications. The segments may follow the shapes and orientations of the groups containing them, with the result that the fibers are bent or shaped to conform to the relative inclinations of the groups. Those fibers in the groups may extend through a more or less symmetrical set of groupings, with the result that they will tend to take a series of fairly regular turns or bends and be sinuous in shape. However, they may wander throughout the groups, turning back on themselves and curling or adopting configurations similar to a question mark or a letter S. The bends in the fibers are usually in the form of curves which may be somewhat sharp or smooth depending upon their arrangement in the bundles. The fibers may comprise relatively straight portions between bends or they may consist of a series of connected curves and curls depending to a large extent upon the shapes of the groups containing them.

In the fabric of this invention, the fibers are in mechanical engagement with one another in the interconnected groups to the extent that the fabric structure is in mechanical equilibrium. The fibers are in frictional engagement with one another due to their relatively close contact in the groups and their bent or curled configurations are entangled or interlocked and resist separation. The closeness of the segments tends to constrain the fibers in the groups and the bends in the fibers tend to prevent their movement along the axes of the groups. Obviously, the longer the fibers the more segments there will be in frictional engagement and the more bends or curls will be entangled. Thus, fabric strength is a function of fiber length as well as other variables. If a binder is present in the base web, a certain amount of it may become effective to hold the fibers in their new positions in the groupings. The effective binder may assist in holding the fibers in close contact with one another and may concentrate within the groups themselves, to assist in holding them together.

In one embodiment of a fabric according to this invention the longitudinal axes of the interconnected groups of fiber segments may extend at various angles to one another, either in the plane of the fabric or at an inclination thereto, such that the fibers they contain may be bent or curled in three dimensions. The inclined groups may connect with other groups which overlap one another with respect to the plane of the web. The overlapping groups and the inclined groups connected to them may contribute body and loft to the fabric and define internal voids between them which add to its absorptive capacity. This structure also is flexible in nature, such that the fabric may be soft and drape or conform well to various shapes. The fabric may vary from a layer of interconnected groups with virtually none overlapping, to a relatively thick fabric with a large number of overlapping groups. FIG. 1 illustrates a typical fabric of this invention falling between these two extremes.

As mentioned hereinbefore, the starting material for the nonwoven fabric of this invention may be a web of fibers 21 arranged in intersecting relation with one another, such that there is only slight entanglement between them, as shown in FIGS. 2 and 3. Webs of this type may be formed by carding, by air deposition, by liquid deposition such as in a paper making process, etc. They may be formed in a single layer or by laminating a plurality of layers formed by these techniques. The fibers in the base web may be arranged in a random manner or more or less oriented, as in a card web, or a card web laminate. The individual fibers may be relatively straight or slightly bent, occurring independently in the web in nongrouped intersecting relation with one another. They may intersect at various angles to one another such that, generally speaking, adjacent fibers only come into contact at the points where they cross. The overlapping, intersecting fibers form interstices 22 between them which vary in size with the fiber density of the web such that for preferred web weights of from 100 to 600 grains per square yard only very small interstices are apparent. Webs ranging in weight from below 100 grains per square yard to about 2,000 grains per square yard may be formed into the fabric of this invention. Such webs may be held together by virtue of the mechanical engagement, i.e., the frictional contact and the aforementioned slight entanglement, between its fibers, as well as by any binder which may be present. Generally speaking, the fibers lie in mechanical equilibrium in the web or layer.

The base web may be subjected to external forces which cause the fibers 21 to move locally with respect to other fibers they intersect and into closer proximity with one another until corresponding fiber portions or segments 24 are parallelized in groups 23. As the individual fibers are moved to bring into closer proximity portions of the fibers which are separated in the base web, a large percentage of the original intersections between the fibers in the web will tend to merge into the groups, such that the web structure of intersecting fibers, FIG. 2, may be replaced by a fabric structure of interconnected groups, FIG. 4.

During the application of external forces, sufficient local support must be provided for preventing these forces from destroying the web integrity, i.e., from pulling the web apart or from converting it into mere clumps of fibers, etc. For this purpose, it is preferred that either an adhesive binder be dispersed throughout the base web, or means be provided for physically contacting the web to provide local support therefor. For best results it is preferred that the web both contain a binder and receive local physical support as mentioned above. Means for applying external forces may cooperate with means for supporting the web locally or means may be provided to accomplish both functions. For instance, the web may be supported in an open position between surfaces oscillating slightly with respect to one another to cause its fibers to form into groups. The application of external forces must be controlled with respect to the binder or supporting means employed to prevent the web from being pulled apart and to prevent the formation of holes, clumps, etc.

An adhesive binder may be included in the web during its formation in the case of a wet-formed web, for instance, or it may be added by impregnation, spraying, or other such means. The binder should be uniformly distributed throughout the base web to provide uniformity in strength and arrangement of groups. In order that groups may be formed, the fibers must be free to move to a certain extent locally with respect to one another, as described hereinbefore. This means that the binder should be rendered sufficiently soft or plastic during the application of external forces, to allow this movement. A solvent or softening agent such as water may be added to the web for this purpose when the web contains a binder which may be softened in this way. The amount of softening agent added may be controlled to provide a web strength which will correspond with the nature and intensity of the external forces applied. When local physical support is not provided, a binder is distributed in the web in such a way that it may be softened to the extent necessary to allow the aforesaid local movement of fibers while it remains effective to maintain the integrity of the web during the application of external forces. A relatively low percentage of binder may be dispersed uniformly throughout the web for this purpose by means such as generally mentioned above and as illustrated hereinafter in the examples.

It is preferred that some liquid, such as water, be uniformly distributed in the web to assist in parallelizing fiber segments and bringing them into close association in the groups. The web may be wet to contain a maximum of water, for instance, prior to the application of bundling forces, although in general less water in the order of about 50 to 250 percent moisture is preferred. The term "percent moisture" above, and when used in the following specification and claims, refers to percentage of moisture by weight of the dry web. The preferred moisture content in a given case depends to a large extent upon the methods used and the results desired. A liquid, such as water, tends to assist the above-mentioned external forces in bringing the fibers together and holding them in their new configurations. Its action may include a surface tension effect whereby the surface tension of the liquid present tends to bring fiber segments closer together as the external forces move them into closer proximity with one another. It would seem that the natural tendency of this effect would be to form substantially circular or oval groups of fiber segments appearing similar to the yarns of woven fabrics. The intensity of the surface tension effect will of course depend upon the amount of liquid present in the web. Once the fibers are brought into close alignment, the surface tension of the liquid may tend to hold them there. There may also be an hydraulic effect, wherein droplets of water tend to enlarge the interstices in the web by pushing fibers out of their way as external forces are applied to the web. Most fibers will absorb water and other liquids, swell, and soften to a certain extent while retaining this moisture, such that if moistened fibers are held together, they will tend to conform and fit closely with one another. Fibers in contact may swell together, and softened fibers may be forced into contact with one another to the extent that they are closely interlocked and tend to stick together. The fibers may swell and soften under the influence of moisture to the extent that they may be bent or curled and will retain their new configurations in contact with the other fibers. In general, these fibers become less resilient and more limp and moldable under the influence of moisture.

As shown in FIG. 8, a fibrous web of the type described containing sufficient binder to maintain its integrity may be moistened to soften the binder, bunched into a ball 33 and then rolled between the hands under slight pressure to form a bundled fabric of this invention. This rolling or compressive action tends to move the fibers in the web into increased contact with one another in the plane of the web. The fibers do not blend or felt into a ball but move about in the web itself such that segments of the fibers come together and form yarn-like groupings. The web may be wet with an excess of moisture and then worked between the hands in such a way that its moisture content is gradually decreased. It has been observed that most of the groupings are formed in the earlier stages of working whether or not the initial moisture content is high or relatively low. It is preferred that the web initially contain well over 100 percent moisture for working by this method. The preferred moisture content for a particular web will depend upon the amount and nature of the binder it contains. Speaking generally, the moist bunched web may be rolled steadily between the hands for a period of less than one half a minute, for instance, and then opened to exhibit a fibrous structure of interconnected groups. A somewhat more regular structure of groups may be formed if the web is alternately bunched, rolled a few times, opened, and then bunched again, etc., until the desired structure is obtained. The web should be worked with care to avoid abrasion and tearing and to assure uniform bundling.

FIG. 9 illustrates another method of applying forces to a web while it is bunched to move its fibers into increased contact with one another and cause grouping. The web, containing sufficient binder to maintain its integrity, may be moistened, bunched and placed in a container, such as a can 34 having a removable screw cap 35 on one end. After the moistened web is inserted in the can and the cap is screwed into place, the can may be shaken vigorously for over one half an hour, for instance, in such a way that the bunched web repeatedly strikes the sides and ends of the can. These repeated blows act to move the fibers in the web into further contact with one another such that fiber groupings will be formed under the influence of the moisture present. Holes 36 may be provided in the sides of the can for expelling excess moisture separating from the web during the shaking operation. If mechanical means are provided for shaking the can vigorously and rapidly, the same, or even improved, results may be obtained more quickly.

FIGS. 8 and 9 illustrate methods by which a web containing binder may be formed into a fabric according to this invention, wherein the web is bunched and supported loosely while being subjected to general compressive forces applied from varying directions. Since no other local support is provided for the web, the presence of a binder is considered necessary for maintaining its integrity.

FIG. 10 illustrates apparatus for providing local support for a web in an open position while applying external forces in the plane of the web to move its fibers into further contact with one another. Fundamentally, this involves placing the web between surfaces which oscillate slightly in the plane of the web with respect to one another. The movement of the surfaces may push or roll the fibers into further contact with one another such that fiber segments will parallelize and form into groups under the influence of the moisture present. The web 37 may be passed between an upper and a lower resilient belt 38 and 39 which may be superimposed with the web between them and passed between upper or lower rollers 41 and 42 which are designed to oscillate axially, or axially and circumferentially, with respect to one another in a manner such as described in U.S. Patent No. 2,093,709 or 2,506,855, both disclosing machines of the continuous felting type. The resilient belts may be continuous with the upper belt 38 passing around the upper rollers 41 and guide rollers 43 at the front and the rear thereof, and with the lower belt 39 passing around the lower rollers 42 and similarly located guide rollers 44. The upper and lower guide rollers 43 and 44 are spaced to cause the upper and lower belts 38 and 39 to converge as they move toward the oscillating rollers and diverge as they leave these rollers.

The web 37 enters between the belts where they converge in front of the upper and lower oscillating rollers and leaves them where they diverge at the rear of these rollers. Suitable tables 45 and 46 may be provided for supporting the web adjacent the points where it enters and leaves the belts. The upper rollers 41 may be urged toward the lower rollers 42, or vice versa, or these rollers may be spaced with respect to one another so as to accommodate the superimposed belts 38 and 39 under pressure between them. The rollers 41 and 42 may oscillate or jiggle circumferentially while they also rotate to feed the superimposed resilient belts between them. The oscillatory motion of the rollers may be partially transmitted through the belts to the web as the web advances therewith, and partially absorbed by the flexure of the resilient material comprising the belts.

The relative oscillatory movement of the belt surface in contact with the web must be controlled, as mentioned above, to prevent the web from being abraded and pulled apart. This may be accomplished by employing belts which are sufficiently thick and sufficiently resilient to absorb a large percentage of the relative oscillatory movement of the upper and lower tiers of rollers. For instance, a pair of belts each comprising sponge rubber ¼ inch thick has given good results when run between rollers oscillating with respect to one another approximately ⅛ inch at 1,500 cycles per minute, both axially and circumferentially. The amplitudes of axial and circumferential oscillation of the rollers may be decreased considerably below ⅛ inch, thereby allowing the use of thinner belts. In fact, one belt may be eliminated such that the web passes between one of the tiers of rollers and the remaining resilient belt. The amplitudes of the axial and circumferential oscillation of the rollers and the thickness of the remaining belt may be designed such that the belt absorbs a goodly portion of the oscillatory motion of the rollers and distributes the applied forces throughout the web in a uniform manner. When one belt is eliminated, the thickness of the remaining belt may be increased to a certain extent, assuming the oscillatory motion of the rollers to be the same, to compensate for the lost thickness of the first belt.

The application of bundling forces to the web by this method may occur in more than one step, such that more than one group of rollers of the type shown in FIG. 10 may be employed. Oscillation of the belts with respect to one another in different directions in the plane of the web may facilitate the formation of groups extending in various directions in the web. However, oscillation in only one direction may give good results, particularly when one of the belts comprises projections or other molding portions designed to participate in group formation as will be described hereinafter.

One of the belts may include a multiplicity of regularly spaced projections, such as shown in FIGS. 14 through 23, which are adapted to enter the web and push the fibers into further contact with one another as the belts are oscillated. Forming belts employing various sizes and shapes of projections in various arrangements are shown in FIGURES 14 through 23. A method and apparatus employing forming devices of this type are shown and described in more detail and claimed in my joint application with George W. Pearce, Serial No. 503,872 filed April 26, 1955. As shown in FIG. 20, a web 65 may be interposed between a forming belt 66 defining spaced projections 67 and a cooperating belt 68 in such a way that it is held between the surface of the cooperating belt and the ends of the projections. The forming belt 66 and the cooperating belt 68 may be urged together and oscillated or moved back and forth with respect to one another in the plane of the web 65 to move fibers in the web away from the ends of the projections 67 and into the spaces 69 between them, as illustrated in FIG. 21. The relative oscillation of the belts may be achieved as described hereinbefore in connection with FIG. 10.

Generally speaking, the size and shape of the holes or openings formed in the web will correspond to the size and shape of the projections. It is preferred that the cooperating belt 68 comprise a resilient material which will protrude into the spaces between the projections 67 as the belts are urged together. The protruding portions 71 of the resilient belt will tend to work the fibers in the spaces 69 between the projections into closer groupings. Group formation may be enhanced by employing projections with inclined sides such as are shown in FIGS. 14 through 16 and 19 through 23. As the belts are oscillated with respect to one another they will first move the fibers off the flat ends of the projections and then, through the protruding portions of the resilient belt, at least part way down the inclined sides of the projections. As shown particularly in FIGS. 22 and 23, projections 72 may be designed with shallow inclined sides 73 to give relatively tight group formation with relatively short projections. The short inclined projections 72 will slowly work their way into the web and the protruding portions of a cooperating resilient belt 74 may be employed to gradually move fibers away from the ends of the projections 72 and down their sides until relatively tight groups 75 of fibers are formed around the bases of the projections.

Belts comprising various sizes and shapes of projections may be employed to give varying results. The projections may be spaced in such a way that the belt might better be described as grooved, in which case the fibers would be moved into the grooves between the projections and the fiber groupings formed would be interconnected in accordance with the pattern of the grooves. FIGS. 14, 15 and 16 illustrate members comprising interconnected grooves 77 defined by projections 78 having inclined sides 79. FIGS. 17 and 18 illustrate round and triangular projections, 81 and 82, respectively, defining corresponding interconnected spaces or grooves between them.

The presence of a small amount of binder in the web is advantageous to assist in maintaining the web integrity and to facilitate web handling during the processing period. While the amount of moisture necessary will depend to some extent upon the amount of binder present, it is preferred that the web contain between about 50 and 250 percent moisture. As will appear from the examples, good results have been obtained from working webs containing a small amount of binder by this method with moisture contents between about 100 and 150 percent.

In FIGS. 11, 12 and 13 there is shown a device for applying external forces to a web in the flat by biasing the web. A swinging frame is provided having longitudinal clamping units 48 and 49 spaced from one another by a set of swinging arms 51 each pivotally connected to the clamping units. Each of the units comprises a pair of small structural angles 52, a corresponding pair of resilient gripping strips 53 and a pair of vise type screw clamps 54 adapted to clamp the angles together with the gripping strips between them. Each of the screw clamps comprises jaws which may be adjusted toward one another by a wing nut 55 which is threaded to a connecting bolt 56 passing through the jaws. The jaws fit over and under opposite horizontal legs 57 of the angles and the inner surfaces of these legs exert clamping pressure on the resilient strips 53. The vertical legs 58 of the angles stiffen the horizontal legs such that the clamping pressure is distributed along the lengths of the angles. Each of the swinging arms 51 is pivotally attached at each end to the horizontal leg 57 of each of the lowermost angles of each clamping unit by means of a pin 59 which passes through a hole in the arm to screw into the angle.

A moist web 61, preferably containing a binder to maintain its integrity, may be clamped in an open position between the clamping strips 53 of the longitudinal clamping units 48 and 49. The strips 53 should be of a resilient material such as rubber in order to assure that the clamping pressure is distributed uniformly along the clamped portions of the web. The clamping units may then be swung back and forth with respect to one another on the pivot arms 51 to bias the web repeatedly in opposite directions and cause its fibers to come into increased contact with one another and form groupings under the influence of the moisture present. The pivot arms may be swung back and forth about 30 degrees on either side of their center position, roughly as shown dotted in FIG. 11, at a uniform rate for less than a minute to cause groupings to be formed in the web. Handles 62 may be provided on each of the units for this purpose.

Biasing the web in this manner tends to compress it or bring its fibers closer together in directions perpendicular to the angle of swing and transverse to the clamping units. Since the bulk of the fibers in the base web extend at various angles to both its long and cross direction, they will tend to be brought into further contact with one another as the web is compressed as described above. As just described, the web itself may be clamped between the resilient strips 53 and held between the clamping units without support being provided between the units other than by the uniformly dispersed binder it contains. It is also possible to clamp the web between resilient or biasable sheets such as rubber diaphragms or sheets of gauze, etc., not shown, co-extensive with the web such that they will move the web while providing it with local support between the units, thereby minimizing the need for binder support.

Figure 24:
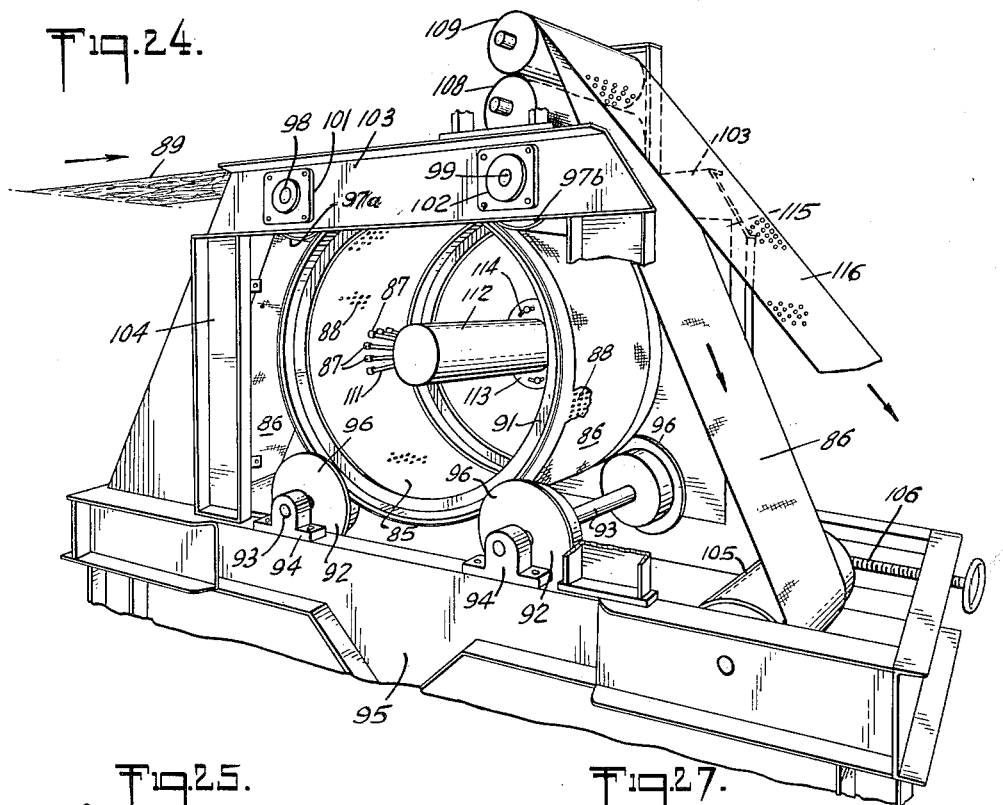
FIG. 24 is a partially cut away schematic view of another apparatus for forming a fabric according to this invention.

In FIG. 24, there is shown an illustrative embodiment of a method and apparatus embodying the use of fluid forces for forming fabrics according to this invention. This method and apparatus are shown and described in detail and claimed in the co-pending application of Frank Kalwaites, Serial No. 567,275 filed February 23, 1956, now Patent No. 2,862,251, granted December 2, 1958.

Referring to FIG. 24, the apparatus comprises a foraminous forming member in the form of a perforated drum 85, a foraminous backing member in the form of a continuous screen belt 86, and spray nozzles 87 inside the drum for projecting streams of a fluid such as a gas or liquid, preferably a liquid, water especially, through its perforations 88. A layer 89 of starting material, suitably in the form of a three-ply laminate of webs of carded cotton fibers, for example, may be sandwiched between the drum and the belt to be formed in to a fabric of this invention by the fluid being projected through the drum, it being water in the case of the illustrative embodiment disclosed herein.

The drum, which may have flanges 91 at each end for reinforcing purposes, is mounted in the cradle formed by two pairs of spaced flanged wheels 92. Each pair comprises a wheel 92 at each end of the drum fixed to a common shaft 93 which in turn is free to rotate in stationary bearings 94 mounted on a fixed foundation frame 95. The axles or shafts 93 supporting each pair of wheels are spaced to provide stable support for the drum 85. Each wheel includes an external flange 96 extending upwardly from its supporting surface beyond one of the ends of the drum 85 and adjacent thereto, thereby holding the drum in position axially.

The screen 86 passes around a major segment of the drum and is held in position thereon by positioning rollers located above the drum and close to its surface. The first positioning roller 97a appears at the left and the second roller 97b appears at the right in FIG. 24. These rollers are fixed to shafts 98 and 99, respectively, which are free to rotate in bearings 101 and 102 mounted on horizontal frame members 103 supported from the foundation frame member 95 by vertical uprights 104 at each end of the drum. The belt also passes around adjustable guide rollers 105 below the drum which may be mounted on shafts free to rotate in bearings (not shown) which are mounted in the foundation frame member 95. The position of at least one of the rollers 105 may be adjusted by positioning bolts 106 which are threaded through the foundation. The position of one or more of these rollers may be adjusted to remove or replace a belt and tension it in position.

The screen belt 86, after passing around the drum 85, turns around the second positioning roller 97b and thence around and through the nip between a pair of squeeze rollers 108 and 109. Preferably, the bottom roller 108 is driven from a power source, not shown, through conventional means such as a belt, chain or a chain of gears, also not shown. The pressure at the nip between the rollers 108 and 109 may be controlled by any suitable means.

Preferably, the nozzles 87 for supplying liquid in streams to the inside wall of the perforated drum 85 are mounted at the ends of tubes 111 arranged in banks along the length of a pressure cylinder 112 which in turn has a flange 113 at one end attached to the main frame through a vertical upright, not shown. The flange 113 possesses slotted bolt holes 114 to allow the cylinder 112 to be positioned properly with respect to the axis of the drum. The nozzle assemblage is stationary and the drum revolves about the same.

Fluid under pressure may be applied to the interior of this cylinder from any suitable source, not shown. There may be one line or bank of nozzles positioned partly or entirely across the perforated wall of the drum, but it is preferred that at least two banks of nozzles be employed. Three, four or even more banks of nozzles may be advantageous under certain conditions since they tend to increase the range of speed of the machine. Various conventional forms of nozzles may be employed, although solid cone nozzles are preferred. The foundation frame member 95 itself may act as a sump for the liquid passing through the portions of the screen in the way of the nozzles, or subsequently falling from the screen, drum, or the pressure nip. However, separate means, not shown, defining a pan or sump in or around the foundation frame, may be employed. Splash plates such as shown at 115 may be attached to the frame at both ends of the drum and similar plates or shields may be designed to fit around the screen to provide a splash-proof enclosure.

In operation, the layer of starting material 89, which may be a web of carded cotton fibers, for example, may be passed over the first positioning roller and into contact with the continuous screen 86. The screen, carrying the web, may be passed around the portion of the drum 85 in the way of liquid being projected through the perforations 88 of the drum, then around the drum, over the second positioning roller 97b, and thence through the nip formed by the squeeze rollers 108 and 109. The bottom squeeze roller 108 drives the screen 86 and the screen carries the web and drives the drum 85 with no slip between the drum and the screen. The web 89 of material is formed into a fabric 116 according to this invention as it passes in the way of the liquid, preferably water, being projected through the perforations in the drum. The fabric retains some of this liquid as it passes around the drum, although most of it passes through the screen and drops into the collecting sump before the screen carrying the layer reaches the pressure nip. At the pressure nip the major portion of the remaining liquid is squeezed from the fabric 116. The fabric is separated from the backing screen 86 after the screen and fabric have passed from the pressure nip and have moved around and over roller 109.

Figure 25:
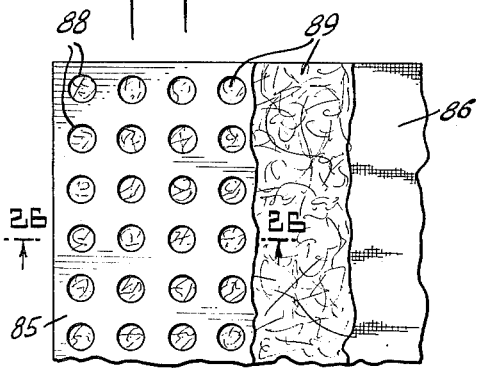
FIG. 25 is a fragmentary partially cut away schematic plan view of a developed segment of the drum of FIG. 24, showing a fibrous layer of starting material positioned between the drum and the foraminous backing screen of this figure.
Figure 26:
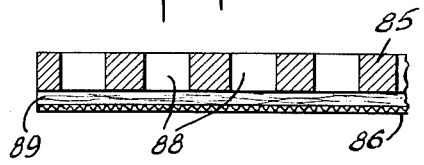
FIG. 26 is an enlarged schematic sectional view taken along the line 26—26 of FIG. 25.

A portion of the sandwich formed by the drum 85, web 89, and screen 86 is shown in FIGS. 25 and 26. The perforations 88 in the drum are round and arranged in a regularly spaced square pattern. In general, it is preferred that the dimension of the foramina or openings in the foraminous screen be substantially less than the dimension of the openings in the drum, and for best results it is preferred that the openings in the screen be considerably smaller than the openings in the drum. For example, with the drum having uniform openings in the order of about 1/32 of an inch in diameter, good results may be obtained where openings in the foraminous screen may vary from about 900 openings per square inch to about 50,000 openings per square inch, preferably from about 10,000 openings to 40,000 openings per square inch.

Figure 28:
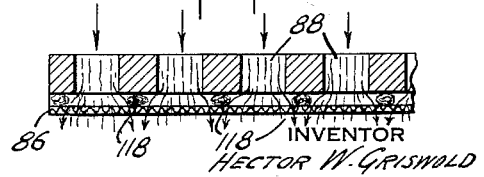
FIG. 28 is an enlarged schematic sectional view taken along the line 28—28 of FIG. 27.

As shown in FIG. 28, the liquid is projected through the perforations 88, in spaced streams which pass through the web striking the screen 86 to spread sideways and then pass through the openings in the screen. The fibers in the web in the way of the streams are moved sideways by the streams beyond the edges of the perforations 88 and under the solid portions of the drum between perforations. As illustrated in FIGS. 27 and 28, the fibers between the perforations may be arranged in yarn-like groups 118 of closely associated and substantially parallelized fiber segments. The groups 118 are interconnected by fibers common to a plurality of bundles at junctures 119 wherein individual fibers are oriented in a plurality of diverse directions generally in the direction of the lay of the web, forming a fabric according to this invention. The groups may be yarn-like in cross section as shown in FIG. 28, particularly midway between junctures where they appear to be most parallelized. The fibers are in mechanical engagement to the extent that they are in mechanical equilibrium.

Two important factors affecting group arrangement are the original orientation of the fibers in the base web and the way in which the web is supported. If the fibers in the base web are predominantly oriented in one direction and the web is supported free of forming means, most of the groups will tend to form in that direction in the web with a fairly high percentage of free fiber segments, of the type described hereinbefore, lying between the groups in the opposite direction. When forming means or means for forming a fabric in accordance with a definite pattern, such as described in connection with FIGS. 14 through 28, are employed, the groups formed in the direction of orientation of the fibers in the base web will be considerably heavier than those which interconnect them. However, group arrangement will depend upon the forming means. If the fibers are distributed in the base web uniformly and are oriented in a substantially random manner, the groups will tend to extend fairly evenly in all directions in the plane of the web.

The following are examples of fabrics and methods according to this invention. It should be understood that they are offered only by way of illustration and are not intended to define the breadth of the invention or limit the scope of the claims.

*Example I*

A fairly uniform fabric of this invention is formed from a very slightly oriented wet-formed base web by working the web between the hands generally as disclosed hereinbefore in connection with FIG. 8. The base web comprises substantially 1.5 denier viscose rayon fibers averaging approximately 3/8 inch in length bonded with approximately 4 percent by weight of a uniformly dispersed highly beaten or hydrated "Mitscherlich" woodpulp binder. Its fibers are arranged to intersect and overlap one another in a substantially nonoriented fashion and the web itself weighs approximately 450 grains per square yard. This web may be formed by dispersing the fibers together with the woodpulp binder in water to create an aqueous slurry which is then passed through a paper-making machine having an inclined Fourdrinier wire which collects the fibers along with the above-mentioned percentage of binder in the form of a fibrous paperlike sheet or web.

After drying, the base web is thoroughly moistened with water and is worked between the hands as described in connection with FIG. 8 at an initial moisture content of approximately 250 percent. The web is bunched, worked, opened, and bunched again, etc., several times for a total working time of about 1/2 minute. Although the web must be handled with care, the woodpulp binder is adequate to maintain its integrity and hold the web together while fiber groupings are being formed. At the end of this time a fairly uniform grouped structure is achieved with a very marked increase in bulk and a corresponding decrease in area. As a result of the absence of orientation of the fibers in the base web, the groupings interconnect and extend in a more or less random manner in the plane of the fabric. The increase in bulk is due to the bending and curling of the fibers and the corresponding formation of groups at angles to the plane of the web, as might be expected in view of the compressive nature of the means employed. The fibers and the groups containing them appear to be curled and sinuous defining voids between them in a fairly regular manner such that the resulting fabric has a knitted appearance. After having been dried under proper conditions to prevent stiffness, this fabric possesses excellent drape and extensibility and increased permeability to moisture and air. It may be relatively soft and resilient due to its three dimensional grouped structure, and due to this structure and its excellent moisture conducting power, it tends to feel relatively dry when compared with the base web from which it was formed.

*Example II*

A similar fabric is formed by working an "oriented" card web laminate in the same manner. In accordance with this example, a base web whose fibers are oriented about ten to one in the machine direction is formed by laminating several card webs until the laminate weighs about 200 grains per square yard. Approximately 75 percent of 1.5 denier viscose rayon fibers about 2 inches in length and 25 percent bleached cotton comber noils averaging about 1/2 inch in length are used. The laminate is then impregnated with a polyvinyl acetate dispersion, such as is sold under the well known trade-name, Elvacet 81–900, by the E. I. du Pont de Nemours & Co., to deposit approximately 16 percent by weight of resin solids throughout the web. It is preferred that this dispersion be moderately plasticized.

The base web is then wet and worked between the hands as described in connection with Example I, except that complete formation may be achieved in a much shorter time, such as a quarter of a minute, mainly due to the lighter web being worked. The web then may be dried under proper conditions to prevent stiffness.

The resulting fabric is similar to that of Example I, but is much lighter and exhibits a much less regular structure. As might be expected, in view of the relatively high orientation of the fibers in the base web, most of the groups are arranged in the same direction with a high percentage of free fiber segments extending between them. This fabric is more open than that of Example I and therefore more permeable to moisture and air. This may be due largely to the lighter base web used. The fabric of this example is net-like and drapes well although it may not be as soft as the fabric of Example I, mainly due to the higher percentage of binder it contains.

*Example III*

A card web laminate similar to that of Example II comprising approximately 1.5 denier viscose rayon fibers averaging around 2 inches in length, also weighing about 200 grains per square yard and having a fiber orientation of about ten to one in the machine direction, may be impregnated with approximately ¼ percent polyvinyl alcohol to form a base web. Said web is thoroughly wet with water, squeezed down to a moisture content of about 200 percent, bunched, and placed in a can having holes in its side and a removable cap, such as shown in FIG. 9. The cap is secured on the can to close its ends and the can is shaken quite violently and with rapidity for an extended period of time in the neighborhood of an hour, during which the bunched web is caused to strike the sides and ends of the can repeatedly to cause its fibers to form into groups in accordance with this invention. The resulting fabric is mesh-like having relatively tight groups of fiber segments predominantly arranged in the direction of orientation of the base web with the largest percentage of free fiber segments appearing at approximately right angles to this direction. After having been properly dried, this fabric is quite porous and permeable to moisture and air with a structure resembling intersecting threads defining voids between them. Its mesh-like structure drapes well and is lace-like in appearance.

*Example IV*

A base web weighing in the neighborhood of 850 grains per square yard and whose fibers are only very slightly oriented may be formed from a dilute aqueous slurry of viscose rayon fibers of approximately 1.5 denier and substantially ½ inch in length and highly beaten "Mitscherlich" sulphite pulp uniformly dispersed therein. The dilute slurry then may be passed rapidly through an inclined Fourdrinier wire such that the above-described web is deposited thereon along with a binder content of about 10 percent by weight.

The moisture content of the base web is adjusted to approximately 200 percent and then worked between the hands, as described in connection with FIG. 8, for a period of approximately two minutes. It then may be dried as mentioned in the foregoing examples. The fabric resulting from this treatment is condensed and considerably thicker than the base web from which it was formed. Its fiber groupings are close together, overlapping and extending at various angles to one another in the plane of the fabric and at an angle thereto, such that many of the voids between groups or courses are hidden and the fabric itself appears quite dense. While this fabric is not as permeable as those described in connection with the preceding examples, it possesses increased body and is flexible and chamois-like to handle.

*Example V*

A lighter base web weighing approximately 350 grains per square yard may be formed by paper-making techniques, as described in connection with Examples I and IV, from ⅜ inch viscose rayon fibers of approximately 1.5 denier and 5 percent by weight of a highly beaten caroa jelly. This web is formed with a fiber orientation of approximately four to one in the machine direction. The moisture content of the web is adjusted to approximately 100 percent and its fibers are formed into groups in accordance wtih this invention by passing the web between opposed tiers of rollers vibrating with respect to one another as described hereinbefore in connection with FIG. 10. The web is fed between these rollers on a single resilient belt such that the web is in contact with the vibrating surfaces of the upper rollers themselves. The belt comprises a layer of sponge rubber ¼ inch thick supported by a layer of canvas which runs against the lower tier of rollers. The upper rollers are about 4 inches in diameter and present a roughened surface of a phenolic impregnated fabric, similar to the material sold under the trademark, "Micarta," by the Westinghouse Electric Company. The web is fed through the rollers on the resilient belt at a speed of approximately 20 feet per minute while the upper rollers oscillate with respect to the lower rollers. The rollers oscillate axially about 0.15 inch at 1,500 cycles per minute and circumferentially approximately 0.13 inch at the same frequency. The longitudinal orientation of the fibers in the base web causes most of the fiber groups to be formed in this direction with a high percentage of free fiber segments extending between them in the cross direction. After having been dried in such a way as to minimize stiffness, this fabric is quite permeable to moisture and air and by virtue of its open structure is flexible and tends to drape like a woven fabric.

*Example VI*

This example employs a base web weighing approximately 400 grains per square yard formed by air deposition of fibers upon a foraminous collecting member using techniques such as described in United States Patent Nos. 2,676,363 and 2,676,364. A very low fiber orientation may be obtained by these techniques. The web comprises viscose rayon fibers averaging about two inches in length bonded with about 4 percent of a polyvinyl acetate dispersion which may be added by impregnation as in Example II. Water is added until a web moisture content of about 250 percent is attained. The moistened web is then secured in a swinging frame such as shown in FIG. 11 between two layers of 44 x 36 bleached gauze. The frame is then swung at a steady rate, as described in connection with this figure, for a period of slightly over one minute to cause fiber segments to form into groups by bringing them into further contact with one another while the web, supported by the aforementioned layers of gauze, is repeatedly biased in opposite directions. After drying according to the foregoing examples, the resulting fabric resembles a fluffy gauze and is relatively porous and highly permeable to moisture and air. It is also quite soft and flexible and possesses superior handle and drape.

*Example VII*

An extremely regular fabric according to this invention is formed by employing apparatus of the type described hereinbefore in connection with FIGS. 24 through 28. The starting material is a triple ply card web laminate weighing about 300 grains per square yard having a fiber orientation ratio of approximately six to one in the direction of movement of the web and comprising approximately 75% viscose rayon fibers about 2″ long and approximately 25% bleached cotton fibers averaging about ½ to ¾ of an inch in length.

The web is fed into apparatus according to FIGURE 24 which comprises a drum approximately $\frac{1}{32}$ of an inch thick having about 250 perforations per square inch of approximately 0.045 inch in diameter arranged in a square pattern therein. The screen passing around the drum is a woven stainless steel screen belt of approximately 200 mesh or substantially 40,000 openings per square inch. Conventional solid cone nozzles are arranged as shown in FIG. 24 in four banks at the ends of corresponding tubes projecting from a centrally located pressure cylinder. The nozzles are located concentrically approximately 6" from the inside surface of the drum which is approximately 30" in diameter. The fibers in the web are rearranged into a fabric structure according to this invention as the web moves with the drum and the screen through the water streams projected from the nozzles. The streams are delivered with a water pressure inside the pressure cylinder of approximately 90 to 100 lbs. per square inch.

The newly formed fabric may be squeezed partially dry by the pressure nip, as described in connection with FIG. 24. The fabric then may be treated with an adhesive, dye or other impregnating or coating material by passing it through a padder or similar conventional equipment. Additional heating or drying means may be employed, before or after the impregnating step, or if no additional impregnating or coating material is necessary, before the fabric is rolled for storage or used.

The base web or layer of starting material may comprise natural fibers, such as fibers of cotton, wood, wool, jute, ramie, or abaca; or artificial fibers of viscose rayon, cuprammonium, cellulose acetate, nylon, Dynel or other materials, alone or in combination with one another. Predominantly normally nonfeltable fibers, i.e., fibers which will not normally felt under ordinary felting conditions, are required when the web is worked without external local support as by rolling between the hands, bunching, etc. Viscose rayon is known to give excellent results in forming the fabric of this invention under most conditions, as is evidenced by the examples. While relatively long textile-type fibers above normal paper making lengths, of close to normal textile length or over, say of about ¼ inch to 2 inches or longer, are preferred for textile applications, shorter fibers, below ¼ inch in length, within the paper range, may be used for these and other applications. It is preferred that the shorter paper making fibers be unbeaten or substantially unhydrated if a textile-like fabric is desired. The choice of fiber length involves practical considerations and is determined to a large extent by the methods which must be used to form the product desired. In this connection, shorter fibers of woodpulp, for instance, may be mixed with longer fibers with the result that the longer fibers will enhance the strength of the resulting fabric and the shorter fibers will decrease its cost. Fiber length is also an important factor affecting fabric strength, as described hereinbefore, and fiber lengths and materials should be chosen with this and other fabric characteristics in mind.

There are a number of suitable adhesive bonding materials or binders which may be employed to maintain the integrity of the web. For instance, water softenable materials including the following may be used: beaten cellulose jellies of wood pulp, caroa, ramie, etc.; natural gums including karaya, locust bean, gum arabic and others; starches; and synthetics, such as polyvinyl alcohol, carboxymethylcellulose, polyvinyl acetate, etc. Suitable binders, softenable by solvents other than water, are exemplified by polyvinyl chloride and polyvinyl butyral and their copolymers, while nonreversible binders which may be used if formation occurs before they are set, include urea-formaldehyde and melamine-formaldehyde.

Having now described the invention in specific detail and exemplified the manner in which it may be carried into practice, it will be readily apparent to those skilled in the art that innumerable variations, applications, modifications and extensions of the basic principles involved may be made without departing from its spirit or scope. Thus the fabrics of the present invention may be laminated with other fabrics, with paper or with other materials, or employed in a host of ways that will be readily apparent to the skilled artisan.

The claims are:

1. A foraminous, self-sustaining nonwoven textile fabric comprising a multiplicity of yarn-like fiber groups having an oval cross section interconnected at junctures by fibers common to a plurality of said groups to define holes, the fibers at said junctures being oriented in a plurality of diverse directions in the lay of the fabric, and the fibers in the yarn-like groups between the junctures being in substantial parallelism and in overlapping relationship with one another with individual interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

2. A foraminous, self-sustaining nonwoven textile fabric comprising substantial areas consisting essentially of a multiplicity of yarn-like fiber groups having an oval cross section interconnected at junctures by fibers common to a plurality of said groups to define holes, the fibers at said junctures being oriented in a plurality of diverse directions in the lay of the fabric, and the fibers in the yarn-like groups between the junctures being in substantial parallelism and in overlapping relationship with one another with individual interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas.

3. A foraminous, self-sustaining nonwoven textile fabric comprising interconnected yarn-like groups of unspun fiber segments closely associated and substantially parallelized about the longitudinal axes of the groups, said groups possessing yarn-like thickness in two dimensions and being interconnected by fibers common to a plurality of groups, said groups and said interconnecting fibers defining holes, individual interconnecting fibers extending in more than one direction in the lay of the fabric and having substantial segments thereof mechanically engaged with other fiber segments in various groups, the fibers in said fabric being in mechanical equilibrium, and said yarn-like fiber groups in areas of fabric containing the same being located between spaced generally parallel planes generally defining the opposed surfaces of the fabric in said areas.

4. A foraminous, self-sustaining nonwoven textile fabric comprising interconnected groups of fiber segments closely associated and substantially parallelized about the longitudinal axes of the groups to the extent that the groups are yarn-like, said interconnected groups extending longitudinally and transversely of the fabric and defining holes between them, said groups being interconnected by fibers common to a plurality of groups, individual interconnecting fibers extending in more than one direction in the lay of the fabric and having substantial segments thereof mechanically engaged with other fiber segments in various groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

5. A foraminous, self-sustaining nonwoven textile fabric comprising a multiplicity of yarn-like fiber groups lying in the plane of the fabric and interconnected at junctures by fibers in the plane of the fabric and common to a plurality of groups to define holes, the fibers in the yarn-like groups between the junctures being in substantial parallelism and in overlapping relationship with one another, and the fibers at such junctures being oriented in a plurality of diverse directions in the lay of the fabric, individual interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

6. A foraminous, self-sustaining nonwoven textile fabric comprising fibers arranged to form interconnected yarn-like bundles of fiber segments, said interconnected bundles defining holes between them, the individual segments in each of said bundles being substantially parallel to the other individual segments in the bundle and consolidated with the same segments with which they are substantially parallel, said bundles being interconnected at junctures by fibers common to a plurality of bundles, individual interconnecting fibers at each juncture extending in more than one direction in the lay of the fabric and having substantial segments thereof mechanically engaged with other fiber segments in various bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

7. A foraminous, self-sustaining nonwoven textile fabric comprising nonfeltable fibers oriented to define a foraminous structure comprising a multiplicity of yarn-like fiber groups interconnected by fibers common to a plurality of groups at junctures to define holes, the fibers at said junctures being oriented in a plurality of diverse directions in the lay of the fabric, the fibers in the yarn-like groups between the junctures being in substantial parallelism and in overlapping relationship with one another, individual of said interconnecting fibers at each juncture having substantial segments thereof in mechanical engagement with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

8. A foraminous, self-sustaining nonwoven textile fabric comprising interconnected yarn-like groups of unspun fiber segments, said segments being closely associated and substantially parallelized about the longitudinal axes of the groups and said groups possessing yarn-like thickness in two dimensions and having an oval cross section, said groups being interconnected at junctures by fibers common to a plurality of groups to define holes, individual of said interconnecting fibers extending in more than one direction in the lay of the fabric and having substantial segments thereof mechanically engaged with other fiber segments in various of the yarn-like groups, the fibers in said fabric being in mechanical equilibrium, and said yarn-like fiber groups in areas of fabric containing the same being located between spaced generally parallel planes generally defining the opposed surfaces of the fabric in said areas, and said yarn-like fiber groups predominantly constituting the body of the fabric in said areas.

9. A foraminous, self-sustaining nonwoven textile fabric comprising nonfeltable fibers arranged to form interconnected yarn-like bundles of fiber segments defining holes between them, segments in each of said bundles being substantially parallel to and consolidated with other segments in the same bundle and said bundles being interconnected by fibers common to a plurality of bundles, individual of said interconnecting fibers extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas.

10. A foraminous, self-sustaining nonwoven textile fabric comprising fibers arranged to form interconnected bundles of fiber segments possessing yarn-like thickness in two dimensions, individual segments in each of said bundles being substantially parallel to the other segments in the bundle and consolidated with the same segments with which they are substantially parallel, said bundles being interconnected by fibers common to a plurality of bundles and defining holes between the bundles, at least some of said substantially parallel and consolidated segments lying in the fabric at locations generally intermediate the perimeters of adjacent holes defined by said interconnected bundles, individual interconnecting fibers extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

11. A foraminous, self-sustaining nonwoven textile fabric comprising fibers arranged to form interconnected yarn-like bundles of fiber segments defining holes between them, individual segments in each of said bundles being substantially parallel and consolidated with other segments in the same bundle to give bundles having an oval cross section, said bundles being interconnected at junctures by fibers common to a plurality of bundles, said interconnecting fibers between any two given bundles being substantially parallel to and consolidated with each other as they pass through the juncture between said two bundles, individual interconnecting fibers at each juncture extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

12. A self-sustaining nonwoven textile fabric comprising fibers arranged to form interconnected yarn-like bundles of fiber segments, said interconnected bundles defining areas of low fiber density between them, individual segments in each of said bundles being substantially parallel to the other individual segments in the bundle and consolidated with the same segments with which they are substantially parallel so that the bundles have an oval cross section, said bundles being interconnected at junctures by fibers common to a plurality of bundles, individual interconnecting fibers at each juncture extending in more than one direction in the lay of the fabric and having substantial segments thereof mechanically engaged with other fiber segments in various of the bundles, the fibers in said fabric being in mechanical equilibrium, and said yarn-like fiber bundles in areas of fabric containing the same being located between spaced generally parallel planes generally defining the opposed surfaces of the fabric in said areas, and said yarn-like fiber bundles predominantly constituting the body of the fabric in said areas.

References Cited in the file of this patent

UNITED STATES PATENTS

| | | |
|---|---|---|
| 720,857 | Tourigny | Feb. 17, 1903 |
| 795,719 | Motz | July 25, 1905 |
| 995,602 | Howes | June 20, 1911 |
| 1,447,708 | Caffrey | Mar. 6, 1923 |
| 1,453,575 | Tong et al. | May 1, 1923 |
| 1,882,599 | Hodshon | Oct. 11, 1932 |
| 1,978,620 | Brewster | Oct. 30, 1934 |
| 1,989,434 | Wallquist | Jan. 29, 1935 |
| 2,170,655 | Fourness | Aug. 22, 1939 |
| 2,351,039 | Hanson | June 13, 1944 |
| 2,366,070 | Strauss | Dec. 26, 1944 |
| 2,416,390 | Hitt | Feb. 25, 1947 |
| 2,486,217 | Slack et al. | Oct. 25, 1949 |
| 2,508,968 | Porritt | May 23, 1950 |
| 2,528,793 | Secrist | Nov. 7, 1950 |
| 2,537,323 | Wurzburger | Jan. 9, 1951 |
| 2,705,687 | Petterson et al. | Apr. 5, 1955 |
| 2,705,688 | Ness et al. | Apr. 5, 1955 |
| 2,712,171 | Hoffman | July 5, 1955 |
| 2,771,363 | Fish | Nov. 20, 1956 |

FOREIGN PATENTS

| | | |
|---|---|---|
| 422,226 | Great Britain | Jan. 8, 1935 |
| 468,106 | Great Britain | June 29, 1937 |
| 116,987 | Japan | Aug. 17, 1938 |
| 120,565 | Japan | June 2, 1937 |
| 131,851 | Japan | Aug. 25, 1939 |

OTHER REFERENCES

Handmade Papers of Japan, T. K. and R. H. Tindale, Charles E. Tuttle Co., Rutland, Vt., and Tokyo, Japan. (Printed in Tokyo in 1952.)

"Matthews' Textile Fibers," 5th ed., John Wiley and Sons, Inc., New York, N.Y., 1947, pages 765–772.